United States Patent Office 3,525,748
Patented Aug. 25, 1970

---

3,525,748
CERTAIN 2-AMINO-3-PHENYL-3,4-DIHYDRO-QUINAZOLIN-4-ONES
Marcel Pesson, Paris, France, assignor to Laboratoire Roger Bellon, Paris, France, a company of France
No Drawing. Continuation of application Ser. No. 460,839, June 2, 1965. This application Apr. 12, 1968, Ser. No. 721,121
Claims priority, application Great Britain, June 3, 1964, 23,057/64
Int. Cl. C07d 51/48
U.S. Cl. 260—256.4        10 Claims

ABSTRACT OF THE DISCLOSURE

There are disclosed certain 2-amino-3-phenyl-3,4-dihydroquinazolin-4-ones and processes for making them. The compounds are sedatives and hypnotics.

CROSS-REFERENCES TO RELATED APPLICATIONS

This is a continuation of Ser. No. 460,839, filed on June 2, 1965, and now abandoned.

This invention relates to substituted 3,4-dihydroquinazolines and their preparation.

The invention provides the new substituted 3,4-dihydroquinazolines of the formula:

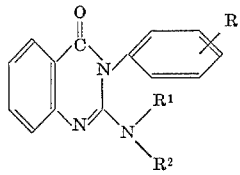

I and their acid addition salts, in which R is hydrogen, an alkyl radical containing up to 5 carbon atoms, an alkoxy radical containing up to 5 carbon atoms, or a halogen atom (especially chlorine), $R^1$ is hydrogen or an alkyl radical containing up to 4 carbon atoms, $R^2$ is an alkyl radical containing up to 4 carbon atoms, a hydroxyalkyl radical containing up to 4 carbon atoms, a cycloalkyl radical (ordinarily containing 5 or 6 carbon atoms), or an amino radical, or $R^1$ and $R^2$ together with the adjacent nitrogen represent a saturated mononuclear heterocyclic group, especially 1-pyrrolidyl, 1-piperidyl, morpholino, or 4-alkyl- or 4-hydroxyalkyl-1-piperazinyl (the alkyl and hydroxyalkyl groups containing up to 4 carbon atoms).

The compounds of Formula I are useful as sedative and hypnotic agents. Of especial value are those in which R is an ortho-methyl, ortho-chloro, or para-chloro substituent, $R^1$ is hydrogen, and $R^2$ is an alkyl radical of up to 4 carbon atoms, especially methyl or ethyl.

According to a feature of the invention, the compounds of Formula I are prepared by condensing an amine of formula $HNR^1R^2$ with a 2-chloro-quinazoline of formula:

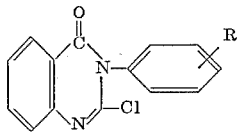

II where R, $R^1$ and $R^2$ are as hereinbefore defined.

This reaction may be carried out by mixing the chloroquinazoline with an excess of the amine (i.e. with at least two molecules of amine for each molecule of chlorocompound), and heating the mixture under reflux in an inert solvent having a boiling point between 80 and 140° C. (preferably benzene, toluene, or xylene). When the boiling point of the amine used is below 100° C., it is possible to work in an autoclave. The products of the reaction are separated in the usual manner by extraction with an aqueous solution of a mineral acid, followed by a basification with a base, preferably ammonia. Certain of the bases of general Formula I give sparingly soluble hydrochlorides which precipitate during the extraction with hydrochloric acid. If this happens, the hydrochloride is separated by filtration and the base is obtained by basification of an aqueous suspension of the hydrochloride. The bases of Formula I are generally obtained as readily recrystallisable solids. In the majority of cases, well crystallised salts can be obtained from the bases in solution in organic solvents by treatment of the base with the theoretical amount of acid. These salts (particularly with the tertiary amines) can sometimes be easily hydrolysed in aqueous solution.

When the amine $HNR^1R^2$ is hydrazine, the 2-hydrazino-dihydroquinazoline can be obtained by reaction at room temperature in alcoholic solution.

According to a further feature of the invention, the 2-chloro-quinazolines of Formula II are prepared by reacting a 2-mercaptoquinazoline of formula:

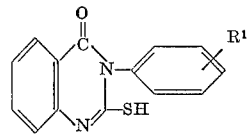

III with sulphur monochloride (i.e. $S_2Cl_2$) or sulphuryl chloride ($SO_2Cl_2$). The reaction is conveniently carried out in an organic solvent, preferably chloroform, at the boiling point. The yield of 2-chloro-quinazoline is up to 65–70%.

The compounds of Formula II because of the presence in them of the 2-chlorine atom which will react with nucleophilic reagents, are useful intermediates for the production of other quinazoline derivatives besides those of Formula I.

The invention includes within its scope pharmaceutical compositions comprising one or more of the compounds of Formula I or acid addition salt thereof in association with a pharmaceutical carrier compatible therewith. Such compositions may be made up in the way conventional for making pharmaceutical compositions, compositions for oral or parenteral administration being preferred. When the active compound is used as a salt, it will, of course, be understood that the salt will be one containing a non-toxic anion, such as a hydrochloride or a maleate.

The present invention is illustrated by the following examples:

EXAMPLE 1

2-chloro-3-phenyl-4-oxo-3,4-dihydroquinazoline (a) A suspension of 60 g. of 2-mercapto-3-phenyl-4-oxo-3,4-dihydroquinazoline in 400 cc. of anhydrous chloroform is vigorously stirred in a two-necked flask equipped with a mechanical stirrer device, a dropping funnel and a reflux condenser. 32 g. of sulphuryl chloride are run in by the dropping funnel in approximately 30 minutes. During this addition, the initial product goes into solution with the producton of a yellow colour and a precipitate forms towards the end of the addition. The mixture is refluxed with stirring until evolution of hydrogen chloride ceases. After cooling, the solution is poured with stirring into 400 cc. of water and then filtered through a sintered glass plate in order to separate the sulphur precipitate. The separated organic phase is washed with water, dried over calcium chloride, the solvent is evaporated, and the residue recrystallised from 60 cc. of carbon tetrachloride (with treatment with animal charcoal). There are thus obtained 42 g. (68.2% yield) of a product, melting at 135–136° C., this temperature not being lowered if the product is mixed with a standard sample of 2-chloro-3-phenyl-4-oxo-3,4-dihydroquinazoline. The infra-red spectra (in KBr) are identical. For analysis purposes, the product is recrystallised from cyclohexane.

Analysis.—$C_{14}H_9ClN_2O$ (M.W., 256.5). Calculated (percent): C, 65.50; H, 3.53; N, 10.91; Cl, 13.81. Found (percent): C, 65.15; H, 3.64; N, 10.78; Cl, 13.60.

(b) A suspension of 5 g. of 2-mercapto-3-phenyl-4-oxo-3,4-dihydroquinazoline in 50 cc. of chloroform is stirred vigorously in a 250 cc. spherical flask equipped with a mechanical stirrer device and a dropping funnel. A solution of 2.7 g. of sulphur monochloride in 10 cc. of anhydrous chloroform is added in 10 minutes by the dropping funnel. The mixture is heated for 30 minutes under reflux. The product of the reaction is isolated as in the experiment (a). The yield is 1.8 g., M.P. 134° C.

EXAMPLE II 2-chloro-3-o-tolyl-4-oxo-3,4-dihydroquinazoline

This compound is obtained under the same conditions as in Example I(a) by the action of a solution of sulphuryl chloride (10.8 g.) in chloroform (20 cc.) on a suspension of 2-mercapto-3-o-tolyl-4-oxo-3,4-dihydroquinazoline in chloroform (150 cc.). The product of the reaction is purified by recrystallisation from di-isopropyl ether. The yield is 13.1 g. (60.6%), M.P. 134° C.

Analysis.—$C_{15}H_{11}ClN_2O$ (M.W., 270.7). Calculated (percent): C, 66.54; H, 4.09; N, 10.34; Cl, 13.09. Found (percent): C, 66.56; H, 4.25; N, 10.15; Cl, 12.73.

EXAMPLE III 2-chloro-3-p-chlorophenyl-4-oxo-3,4-dihydroquinazoline

This product, M.P. 161° C., is obtained from 2-mercapto-3-p-chlorophenyl-4-oxo-3,4-dihydroquinazoline by the procedure described in Example I(a), and it is purified by recrystallisation from cyclohexane.

Analysis.—$C_{14}H_8Cl_2N_2O$ (M.W., 291.1). Calculated (percent): C, 57.76; H, 2.77; N, 9.62. Found (percent): C, 57.92; H, 2.90; N, 9.54.

EXAMPLE IV 2-morpholino-3-phenyl-4-oxo-3,4-dihydroquinazoline (a) A solution of 2-chloro-3-phenyl-4-oxo-3,4-dihydroquinazoline 10.2 g., prepared as described in Example I, and morpholine (7 g.) in 100 cc. of benzene is heated for 4 hours under reflux. After cooling, the mixture is extracted with 100 cc. of 2.5 N-hydrochloric acid. The acid solution is decolorised by stirring with animal charcoal, filtered, and then made alkaline by the addition of concentrated ammonia solution. The base which precipitates is filtered off, washed with water, dried in vacuum over phosphoric oxide and then recrystallised from methanol, M.P. 168° C.

Analysis.—$C_{18}H_{17}N_3O_2$ (M.W., 307.34). Calculated (percent): C, 70.34; H, 5.58; N, 13.67. Found (percent): C, 70.78; H, 5.64; N, 13.97.

This base gives salts which can be easily hydrolysed in alkaline solution.

This process can readily be adapted for the preparation of other compounds of Formula I by substitution of the appropriate starting materials.

(b) 2-(1-piperidyl)-3-phenyl-4-oxo-3,4-dihydroquinazoline

Recrystallised from cyclohexane, M.P. 154° C.
Analysis.—$C_{19}H_{19}N_3O$ (M.W., 305.37). Calculated (percent): C, 74.73; H, 6.27; N, 13.76. Found (percent): C, 75.83; H, 6.35; N, 13.80.

(c) 2-(1-pyrrolidyl)-3-phenyl-4-oxo-3,4-dihydroquinazoline

Recrystallised from cyclohexane, M.P. 155° C.
Analysis.—$C_{18}H_{17}N_3O$ (M.W., 291.34). Calculated (percent): C, 74.20; H, 5.88; N, 14.42. Found (percent): C, 74.06; H, 5.60; N, 14.48.

(d) 2-(4-methyl-1-piperazinyl)-3-phenyl-4-oxo-3,4-dihydroquinazoline

Recrystallised from a mixture of benzene and cyclohexane, M.P. 191° C.
Analysis.—$C_{19}H_{20}N_4O$ (M.W., 320.38). Calculated (percent): C, 71.22; H, 6.29; N, 17.49. Found (percent): C, 70.90; H, 6.14; N, 17.64.

This base gives a maleate, M.P. 169–170° C., which is soluble in water and can be recrystallised from alcohol.

(e) 2-(4-β-hydroxyethyl-1-piperazinyl)-3-phenyl-4-oxo-3,4-dihydroquinazoline

Recrystallized from a mixture of benzene-cyclohexane, M.P. 147° C.
Analysis.—$C_{20}H_{22}N_4O_2$ (M.W., 350.4). Calculated (percent): C, 68.55; H, 6.33; N, 15.99. Found (percent): C, 68.72; H, 6.43; N, 16.16.

The oxalate has M.P., 219° C., recrystallised from alcohol.

(f) 2-β-hydroxyethylamino-3-phenyl-4-oxo-3,4-dihydroquinazoline

Recrystallised from benzene, M.P. 140° C.
Analysis.—$C_{16}H_{15}N_3O_2$ (M.W., 281.3). Calculated (percent): C, 68.31; H, 5.38; N, 14.94. Found (percent): C, 68.00; H, 5.60; N, 15.03.

The hydrochloride melts at about 215° C. (with decomposition) and is soluble in water.

(g) 2-n-butylamino-3-phenyl-4-oxo-3,4-dihydroquinazoline

Recrystallised from ethanol, M.P. 150° C.
Analysis.—$C_{18}H_{19}N_3O$ (M.W., 293.36). Calculated (percent): C, 73.69; H, 6.53; N, 14.33. Found (percent): C, 73.83; H, 6.64; N, 14.32.

(h) 2-cyclohexylamino-3-phenyl-4-oxo-3,4-dihydroquinazoline

Recrystallised from cyclohexane, M.P. 133° C.
Analysis.—$C_{20}H_{21}N_3O$ (M.W., 319.2). Calculated (percent): C, 75.21; H, 6.63; N, 13.16. Found (percent): C, 75.09; H, 6.68; N, 13.21.

(i) 2-(4-β-hydroxyethyl-1-piperazinyl)-3-o-tolyl-4-oxo-3,4-dihydroquinazoline

Recrystallised from a mixture of cyclohexane-benzene, M.P. 137° C.
Analysis.—$C_{21}H_{24}N_4O_2$ (M.W., 364.4). Calculated (percent): C, 69.21; H, 6.64; N, 15.38. Found (percent): C, 68.90; H, 6.58; N, 15.29.

It forms a maleate, M.P., 165° C., recrystallised from ethanol.

(j) 2-(4-methyl-1-piperazinyl)-3-o-tolyl-4-oxo-3,4-dihydroquinazoline

Recrystallised from cyclohexane, M.P. 125° C.
Analysis.—$C_{20}H_{22}N_4O$ (M.W., 334.2). Calculated (percent): C, 71.83; H, 6.63; N, 16.76. Found (percent): C, 71.87; H, 6.72; N, 16.90.

It forms a maleate, M.P. 184° C. (with decomposition), recrystallised from ethanol.

(k) 2-(4-methyl-1-piperazinyl)-3-p-chlorophenyl-4-oxo-3,4-dihydroquinazoline

Recrystallised from cyclohexane, M.P. 169° C.
Analysis.—$C_{19}H_{19}ClN_4O$ (M.W., 354.5). Calculated (percent): C, 64.31; H, 5.39; N, 15.79. Found (percent): C, 64.60; H, 5.54; N, 15.84.

It forms a maleate, M.P.=about 208° C. (with decomposition), recrystallised from methanol.

(l) 2-(4-β-hydroxyethyl-1-piperazinyl)-3-p-chlorophenyl-4-oxo-3,4-dihydroquinazoline Recrystallised from cyclohexane, M.P. 167° C.

*Analysis.*—$C_{20}H_{21}ClN_4O_2$ (M.W., 384.5). Calculated (percent): C, 62.42; H, 5.49; N, 14.56. Found (percent): C, 62.88; H, 5.61; N, 14.60.

It forms a maleate, M.P.=about 169° C. (with decomposition), recrystallised from alcohol.

EXAMPLE V (a) 2-methylamino-3-phenyl-4-oxo-3,4-dihydroquinazoline 10 g. of 2-chloro-3-phenyl-4-oxo-3,4-dihydroquinazoline and a solution of methylamine (10 g.) in toluene (80 cc.) are heated for 6 hours in an autoclave to 130° C. After cooling, the toluene solution is washed with water and then extracted with 2.5 N-hydrochloric acid. The acid extract is made alkaline with ammonia. The precipitate is filtered off, washed with water, dried, and recrystallised from a mixture of benzene-cyclohexane; it melts at 160° C.

*Analysis.*—$C_{15}H_{13}N_3O$ (M.W., 251.3). Calculated (percent): C, 71.69; H, 5.21; N, 16.72. Found (percent): C, 71.68; H, 5.17; N, 16.84.

This base gives a hydrochloride, M.P. 244° C. (with decomposition).

The following secondary amino compounds were obtained by repeating the process described above.

(b) 2-ethylamino-3-phenyl-4-oxo-3,4-dihydroquinazoline

Recrystallised from cyclohexane, M.P. 120° C.

*Analysis.*—$C_{16}H_{15}N_3O$ (M.W., 265.3). Calculated (percent): C, 72.43; H, 5.70; N, 15.84. Found (percent): C, 72.50; H, 5.68; N, 15.82.

It forms a maleate, M.P. 139° C. (with decomposition), recrystallised from ethyl acetate. The hydrochloride is sparingly soluble in water.

(c) 2-dimethylamino-3-phenyl-4-oxo-3,4-dihydroquinazoline

Recrystallised from cyclohexane, M.P. 132° C.

*Analysis.*—$C_{16}H_{15}N_3O$ (M.W., 265.3). Calculated (percent): C, 72.43; H, 5.70; N, 15.84. Found (percent): C, 72.39; H, 5.62; N, 15.78.

(d) 2-diethylamino-3-phenyl-4-oxo-3,4-dihydroquinazoline

Recrystallised from cyclohexane, M.P. 127° C.

*Analysis.*—$C_{18}H_{19}N_3O$ (M.W., 293.36). Calculated (percent): C, 73.69; H, 6.53; N, 14.33. Found (percent): C, 73.40; H, 6.60; N, 14.12.

(e) 2-n-propylamino-3-phenyl-4-oxo-3,4-dihydroquinazoline

Recrystallised from cyclohexane, M.P. 127° C.

*Analysis.*—$C_{17}H_{17}N_3O$ (M.W., 279.3). Calculated (percent): C, 73.09; H, 6.13; N, 15.04. Found (percent): C, 73.07; H, 6.30; N, 15.06.

It forms a hydrochloride, M.P. about 170° C. (with decomposition), sparingly soluble in water.

(f) 2-isopropylamino-3-phenyl-4-oxo-3,4-dihydroquinazoline

Recrystallised from cyclohexane, M.P. 119° C.

*Analysis.*—$C_{17}H_{17}N_3O$ (M.W., 279.3). Calculated (percent): C, 73.09; H, 6.13; N, 15.04. Found (percent): C, 72.83; H, 6.30; N, 14.98.

It forms a hydrochloride, M.P.=about 162° C. (with decomposition).

(g) 2-ethylamino-3-o-tolyl-4-oxo-3,4-dihydroquinazoline

Recrystallised from cyclohexane, M.P. 106° C.

*Analysis.*—$C_{17}H_{17}N_3O$ (M.W., 279.3). Calculated (percent): C, 73.09; H, 6.13; N, 15.04. Found (percent): C, 73.18; H, 6.23; N, 15.22.

It forms a hydrochloride, M.P.=about 270° C. (with decomposition), sparingly soluble in water.

(h) 2-methylamino-3-o-tolyl-4-oxo-3,4-dihydroquinazoline

Recrystallised from cyclohexane, M.P. 159° C.

*Analysis.*—$C_{16}H_{15}N_3O$ (M.W., 265.3). Calculated (percent): C, 72.43; H, 5.70; N, 15.84. Found (percent): C, 72.56; H, 5.79; N, 15.82.

It forms a hydrochloride, M.P.=about 260° C. (with decomposition), sparingly soluble in water.

(i) 2-methylamino-3-p-chlorophenyl-4-oxo-3,4-dihydroquinazoline

Recrystallised from a mixture of cyclohexane-benzene, M.P. 193° C.

*Analysis.*—$C_{15}H_{12}ClN_3O$ (M.W., 285.7). Calculated (percent): C, 63.05; H, 4.23; N, 14.70; Cl, 12.40. Found (percent): , 63.38; H, 4.28; N, 14.70; Cl, 12.47.

It forms a hydrochloride sparingly soluble in water.

(j) 2-ethylamino-3-p-chlorophenyl-4-oxo-3,4-dihydroquinazoline

Recrystallised from a mixture of cyclohexane-benzene, M.P. 154° C.

*Analysis.*—$C_{16}H_{14}ClN_3O$ (M.W., 299.5). Calculated (percent): C, 64.11; H, 4.70; N, 14.02; Cl, 11.83. Found (percent): C, 63.85; H, 4.74; N, 14.04; Cl, 11.70.

It forms a hydrochloride sparingly soluble in water.

EXAMPLE VI 2-hydrazino-3-phenyl-4-oxo-3,4-dihydroquinazoline

A solution of 2-chloro-3-phenyl-4-oxo-3,4-dihydroquinazoline (7.5 g.) in alcohol (150 cc.) is vigorously stirred and 3 g. of hydrazine hydrate are added thereto. After a few minutes, the product of the reaction precipitates. After stirring for one hour at normal temperature, the solid is filtered off and recrystallised from 80% aqueous dimethylformamide, M.P.=about 210° C. (with decomposition).

*Analysis.*—$C_{14}H_{12}N_4O$ (M.W., 252.3). Calculated (percent): C, 66.65; H, 4.79; N, 22.21. Found (percent): C, 67.00; H, 4.94; N, 21.95.

With benzaldehyde, this product gives a hydrazone, M.P. 220° C. (from alcohol).

EXAMPLE VII 2-chloro-3-o-chlorophenyl-4-oxo-3,4-dihydroquinazoline

This compound is obtained, by the method of Example I(a), by the action of sulphuryl chloride on 2-mercapto-3-o-chlorophenyl-4-oxo-3,4-dihydroquinazoline. After recrystallisation from carbon tetrachloride, it melts at 143° C., and the yield is 62%.

*Analysis.*—$C_{14}H_8Cl_2N_2O$ (M.W., 291.1). Calculated (percent): C, 57.76; H, 2.77; N, 9.62. Found (percent): C, 57.56; H, 2.98; N, 9.47.

EXAMPLE VIII 2-chloro-3-p-ethoxyphenyl-4-oxo-3,4-dihydroquinazoline

This compound is obtained, by the method of Example I(a), by the action of sulphuryl chloride on 2-mercapto-3-p-ethoxyphenyl-4-oxo-3,4-dihydroquinazoline. After recrystallisation from carbon tetrachloride, it melts at 190° C., and the yield is 79%.

*Analysis.*—$C_{16}H_{13}ClN_2O_2$ (M.W., 300.7). Calculated (percent): C, 64.05; H, 4.36; N, 9.34. Found (percent): C, 63.57; H, 4.40; N, 9.20.

EXAMPLE IX

Proceeding as in Example IV(a), using as starting materials the appropriate amines and the products of Examples VII and VIII, the following compounds have been prepared:

(a) 2-(4-methyl-1-piperazinyl)-3-o-chlorophenyl-4-oxo-3,4-dihydroquinazoline

Recrystallised from benzene, M.P. 169° C.

*Analysis.*—$C_{19}H_{19}ClN_4O$ (M.W., 354.5). Calculated (percent): C, 64.31; H, 5.39; N, 15.79; Cl, 9.9. Found (percent): C, 64.70; H, 5.46; N, 15.62; Cl, 10.1.

It forms a maleate, M.P. about 155° C. (dec.).

(b) 2-β-hydroxyethylamino-3-p-ethoxyphenyl-4-oxo-3,4-dihydroquinazoline

Recrystallised from toluene, M.P. 150° C.

Analysis.—$C_{18}H_{19}N_3O_3$ (M.W., 325). Calclulated (percent): C, 66.44; H, 5.89; N, 12.92. Found (percent): C, 66.74; H, 6.00; N, 13.02.

(c) 2-(4-methyl-1-piperazinyl)-3-p-chlorophenyl-4-oxo-3,4-dihydroquinazoline

Recrystallised from toluene, M.P. 144° C.

Analysis.—$C_{21}H_{24}N_4O_2$ (M.W., 364.4). Calculated (percent): C, 69.21; H, 6.64; N, 15.38. Found (percent): C, 68.85; H, 6.54; N, 15.49.

It forms a maleate, M.P. about 180° C. (dec.).

EXAMPLE X

Proceeding as in Example V(a), using as starting materials the appropriate amines and the products of Examples VII and VIII, the following compounds have been prepared.

(a) 2-ethylamino-3-o-chlorophenyl-4-oxo-3,4-dihydroquinazoline

Recrystallised from toluene, M.P. 133° C.

Analysis.—$C_{16}H_{14}ClN_3O$ (M.W., 299.5). Calculated (percent): C, 64.11; H, 4.70; N, 14.02; Cl, 11.83. Found (percent): C, 64.21; H, 4.68; N, 14.12; Cl, 11.93.

It forms a maleate, M.P. 155° C. (dec.).

(b) 2-methylamino-3-o-chlorophenyl-4-oxo-3,4-dihydroquinazoline

Recrystallised from toluene, M.P. 203° C.

Analysis.—$C_{15}H_{12}ClN_3O$ (M.W., 285.7). Calculated (percent): C, 63.05; H, 4.23; N, 14.70; Cl, 12.40. Found (percent): C, 62.81; H, 4.24; N, 14.76; Cl, 12.44.

It forms a maleate, M.P. 147° C. (dec.).

(c) 2-ethylamino-3-p-ethoxyphenyl-4-oxo-3,4-dihydroquinazoline

Recrystallised from toluene, M.P. 129° C.

Analysis.—$C_{18}H_{19}N_3O_2$ (M.W. 309.4). Calculated (percent): C, 69.88; H, 6.19; N, 13.58. Found (percent): C, 70.05; H, 6.32; N, 13.56.

(d) 2-methylamino-3-p-ethoxyphenyl-4-oxo-3,4-dihydroquinazoline

Recrystallised from toluene, M.P. 154° C.

Analysis.—$C_{17}H_{17}N_3O_2$ (M.W., 295.3). Calculated (percent): C, 69.13; H, 5.80; N, 14.23. Found (percent): C, 69.08; H, 5.72; N, 14.15.

The sedative and hypnotic effects of the compounds of the invention have been shown by the following pharmacological tests.

The toxicity ($LD_{50}$) of the compounds was determined both orally and intraperitoneally in the mouse by the usual method and calculated by the probit method. Similar toxicity tests were made in the rat.

The hypnotic effect ($HD_{50}$) of the compounds was studied both orally and intraperitoneally in the mouse and orally in the rat.

The following tables show the results obtained and the symptoms observed using the indicated compounds. For comparison, the results obtained using the known hypnotics "Mecloqualone" and "Hyptor," are also given.

TABLE I.—RESULTS IN THE MOUSE

| Product of Example | Toxicity | | | Hypnotic effect | | | Therapeutic index | |
|---|---|---|---|---|---|---|---|---|
| | $LD_{50}$ mg./kg. | | | $HD_{50}$ mg./kg. | | | | |
| | Intraperitoneal | Oral | Symptoms | Intraperitoneal | Oral | Symptoms | Intraperitoneal | Oral |
| V(h) | 350–400 | 1,100 | Asphyxia | 70 | 140–160 | Excitation, followed by hypnosis with muscular relaxation; salivation. | 5–6 | 7–8 |
| V(g) | 550 | >1,500 | do | 55 | 140 | Excitation, followed by calm hypnosis | 10 | >10 |
| X(b) | 350 | >1,500 | Convulsions asphyxia | 85 | 300–350 | Good hypnosis | 4 | >5 |
| X̄(a) | 500 | >1,500 | do | 70 | 125 | do | 7 | 12 |
| V̄(i) | 600 | >1,500 | do | 140 | 800 | Excitation, followed by catatonia on awakening. | 4 | 2 |
| V(a) | 600–650 | 1,200–1,400 | Death from asphyxia | 180 | 600 | Hypnosis with convulsive spasms and catatonia. | 3.5 | 2 |
| Hyptor L | 350–400 | 850 | Trembling | 50 | 120 | } Agitation, then hypnosis { | 8 | 7 |
| EG | 350–350 | 750 | Lacrimation and asphyxia | 80 | 125 | | 4 | 6 |

TABLE II.—RESULTS IN THE RAT

| Product of Example | Number of rats tested | Sex | Toxicity | | Hypnotic effect | | Therapeutic Index |
|---|---|---|---|---|---|---|---|
| | | | $LD_{50}$ (mg./kg.) oral | Symptoms | $HD_{50}$ (mg./kg.) oral | Symptoms | |
| V(g) | 5 | Female | 6,502 | | 80 | About 15 minute prehypnotic period with spasm, paralysis of the posterior train, and catatonia; about 1 hour calm hypnosis, but muscular relaxation does not appear at once. | 8 |
| V(g) | 5 | Male | 6,502 | | 80 | At 100 mg./kg.: from 10 minutes to 2 hours prehypnotic period with ataxia and trembling; hypnosis of very variable length 5 minutes to 6 hours with muscular stiffness and slight spasm followed by relaxation. | 8 |
| V(h) | 5 | do | 500 | | 180 | Prehypnotic period 2 to 15 minutes; good hypnosis for 15 minutes to 2¼ hours. | 2.7 |
| V(h) | 5 | Female | 500 | | 180 | Prehypnotic period 3 to 25 minutes; good hypnosis with muscular relaxation for ¾ to 4 hours. | 2.7 |
| X̄(a) | 5 | do | 600 | | 225 | Prehypnotic period very long with spasms. | 2.6 |
| Hyptor | 5 | do | 180 | Asphyxia | 40 | Prehypnotic period, 30 minutes; calm hypnosis for ¾ to 1 hour with salivation and a long recovery period. | 4.5 |
| Mecloqualone | 5 | do | 350 | do | 160 | Prehypnotic period 12 minutes; calm hypnosis for 1 hour. | 2 |

I claim:

1. A 3,4-dihydroquinazoline compound selected from the group consisting of 3,4-dihydroquinazoline of the formula

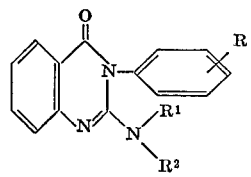

wherein

R is a member selected from the group consisting of hydrogen, alkyl having 1 to 5 carbon atoms, alkoxy having 1 to 5 carbon atoms, and halogen;

$R^1$ is a member selected from the group consisting of hydrogen and alkyl having 1 to 4 carbon atoms; and $R^2$ is a member selected from the group consisting of alkyl having 1 to 4 carbon atoms, hydroxy alkyl having 1 to 4 carbon atoms, cyclopentyl, cyclohexyl, and the amino group, and $R^1$ and $R^2$ together with the nitrogen atoms to which they are attached, form the morpholine, piperidine, pyrrolidine, 4-alkyl piperazine, and 4-hydroxy alkyl piperazine ring, the alkyl and hydroxy alkyl substituents in said piperazine ring having 1 to 4 carbon atoms, and its non-toxic acid addition salts.

2. The compound according to claim 1, wherein
R is methyl in ortho-position,
$R^1$ is hydrogen, and
$R^2$ is methyl,
said compound being designated as 2-methylamino-3-o-tolyl-4-oxo-3,4-dihydroquinazoline.

3. The compound according to claim 1, wherein
R is hydrogen,
$R^1$ is hydrogen, and
$R^2$ is methyl,
said compound being designated as 2 - methylamino-3-phenyl-4-oxo-3,4-dihydroquinazoline.

4. The compound according to claim 1, wherein
R is methyl in o-position,
$R^1$ is hydrogen, and
$R^2$ is ethyl,
said compound being designated as 2 - ethylamino-3-(o-tolyl)-4-oxo-3,4-dihydroquinazoline.

5. The compound according to claim 1, wherein
R is chlorine in o-position,
$R^1$ is hydrogen, and
$R^2$ is methyl,
said compound being designated as 2 - methylamino-3-(o-chloro phenyl)-4-oxo-3,4-dihydroquinazoline.

6. The compound according to claim 1, wherein
R is chlorine in o-position,
$R^1$ is hydrogen, and
$R^2$ is ethyl,
said compound being designated as 2 - ethylamino-3-(o-chloro phenyl)-4-oxo-3,4-dihydroquinazoline.

7. The compound according to claim 1, wherein
R is chlorine in p-position,
$R^1$ is hydrogen, and
$R^2$ is methyl,
said compound being designated as 2-methylamino-3-(p-chloro phenyl)-4-oxo-3,4-dihydroquinazoline.

8. The compound according to claim 1, wherein
R is methyl in o-position
$R^1$ is hydrogen, and
$R^2$ is methyl,
in the form of its hydrochloride, said compound being designated as the hydrochloride of 2-methylamino-3-o-tolyl-4-oxo-3,4-dihydroquinazoline.

9. The compound according to claim 1, wherein
R is hydrogen,
$R^1$ is hydrogen, and
$R^2$ is methyl,
in the form of its hydrochloride, said compound being designated as the hydrochloride of 2 - methylamido-3-phenyl-4-oxo-3,4-dihydroquinazoline.

10. The compound according to claim 1, wherein
R is methyl in ortho-position,
$R^1$ is hydrogen,
$R^2$ is alkyl with 1 to 4 carbon atoms,
said compound being designated as 2 - alkylamino-3-o-tolyl-4-oxo-3,4-dihydroquinazoline, and its non-toxic acid addition salts.

References Cited

UNITED STATES PATENTS 3,213,094  10/1965  Morgan et al.

OTHER REFERENCES

Grout et al.: J. Chem. Soc., 1960, pp. 3540–5.

ALEX MAZEL, Primary Examiner

R. J. GALLAGHER, Assistant Examiner

U.S. Cl. X.R.

260—247.2, 268, 251; 424—248, 250, 251